United States Patent Office 3,423,055
Patented Jan. 21, 1969

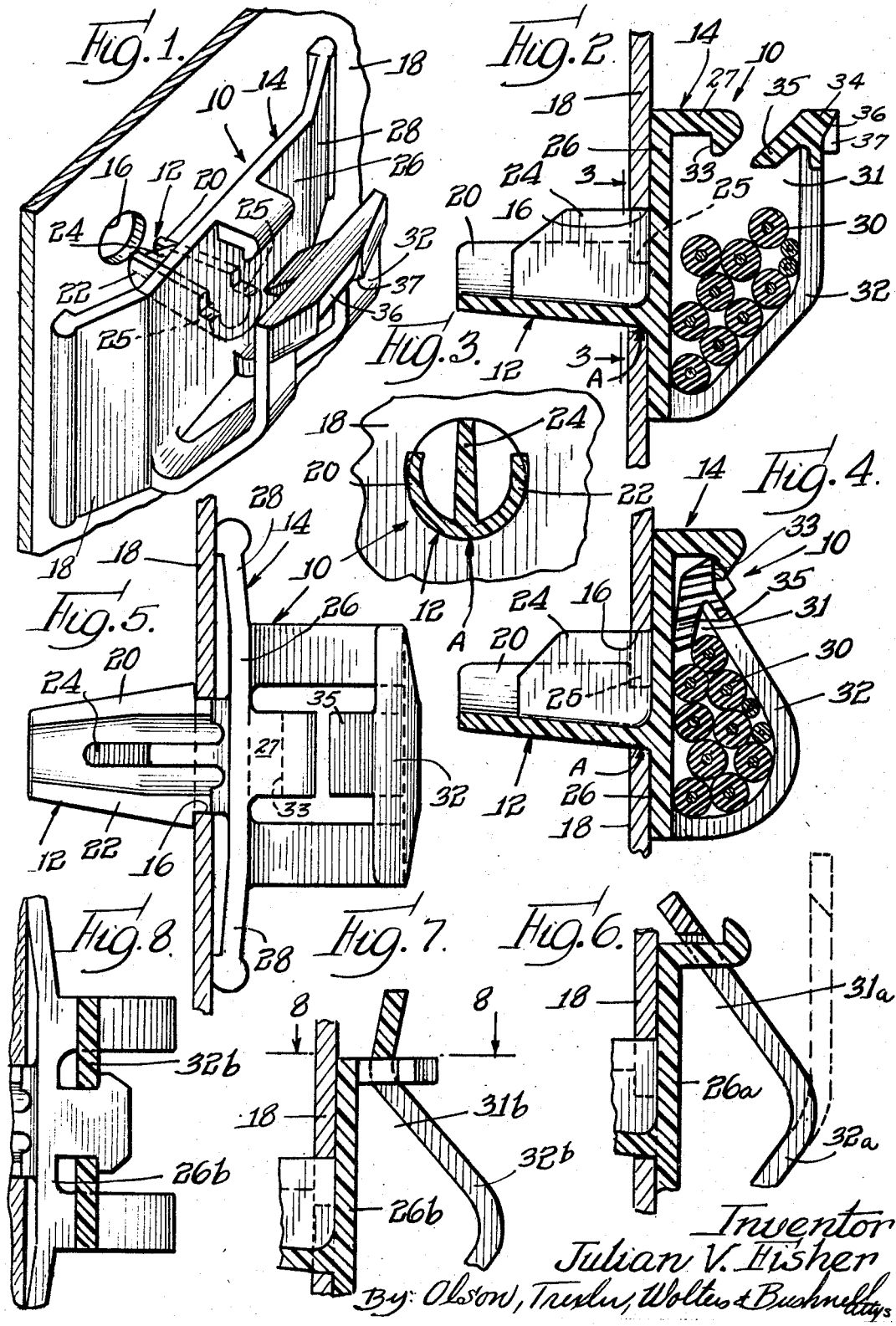

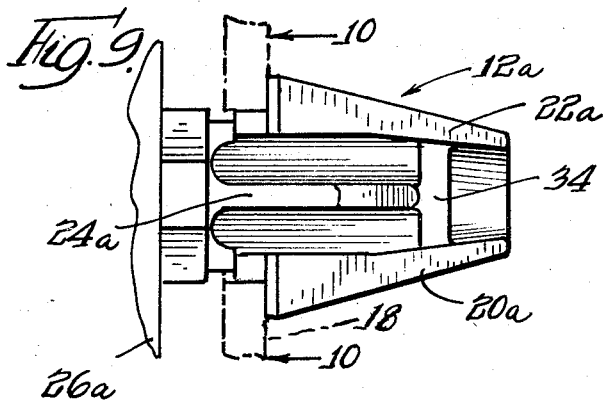
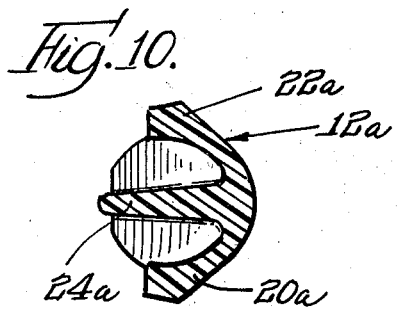
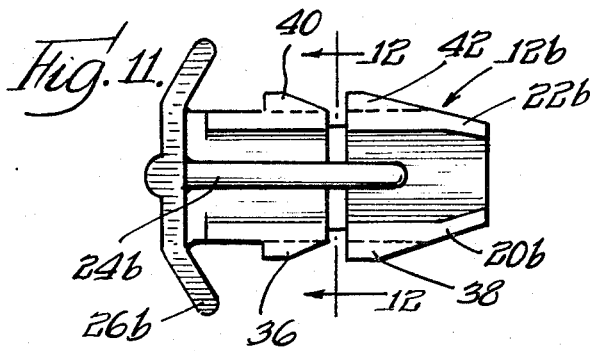
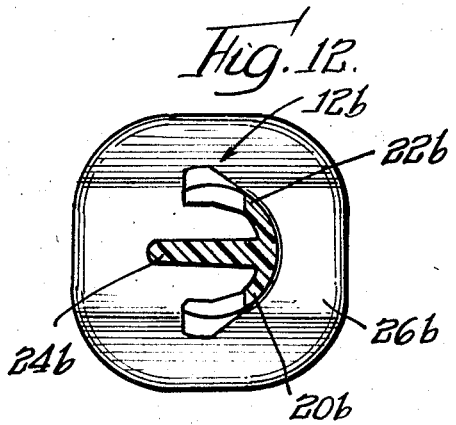
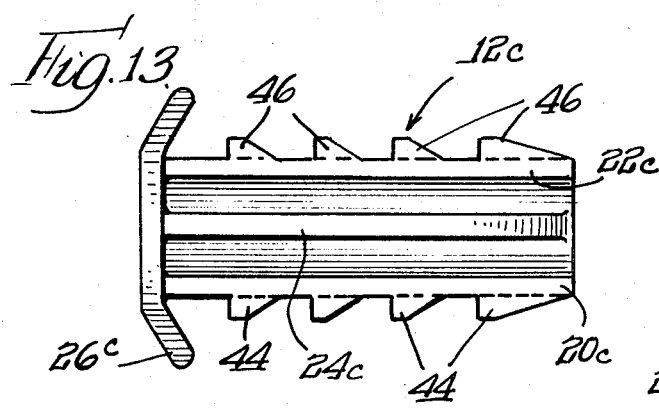
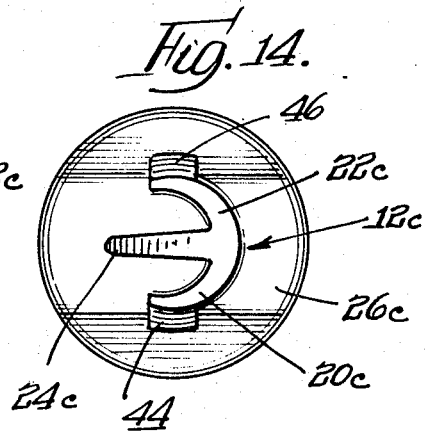
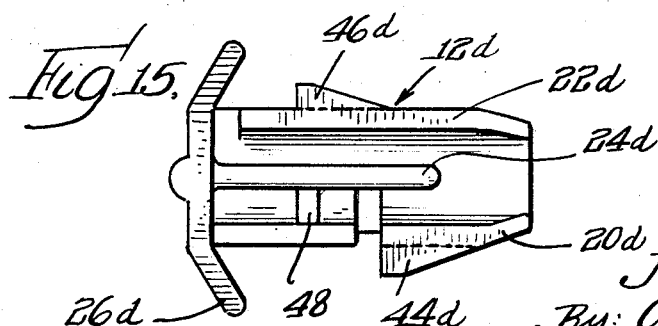

3,423,055
PLASTIC FASTENER AND CABLE SUPPORT
Julian V. Fisher, Carpentersville, Ill., assignor to Illinois Tool Works Inc., Chicago, Ill., a corporation of Delaware
Filed Oct. 24, 1966, Ser. No. 588,976
U.S. Cl. 248—73    19 Claims
Int. Cl. F16l 3/12; F16b 21/08, 43/00

ABSTRACT OF THE DISCLOSURE

This invention relates generally to fastener studs, and more particularly to fastener studs of the type having a shank adapted to be telescopically associated and snapped into locking association with an apertured workpiece as the head of the stud is clamped against the workpiece.

---

The present application discloses a one-piece plastic fastener and cable support which includes a shank for insertion within the aperture of a work panel, said shank being laterally yieldable to permit insertion within the work aperture. The shank is combined with a head structure for clampingly engaging the side of a work panel surface oppositely disposed from the panel surface engageable by the shoulder of the shank. One form of head structure includes means for accommodating elongated work elements such as electrical conductors or cables. An arm or wall portion is normally spaced from the plate of the head to provide sufficient space for accommodating an elongated workpiece and the free extremity of the arm or wall section is adapted to interlock with means provided in the general vicinity of the margin of the head portion oppositely disposed from the margin from which the wall portion extends.

More specifically, the invention contemplates the provision of a novel and very practical stud shank construction which makes it possible to telescopically associate a shank with an apertured workpiece by the exercise of minimum axial force and with the assurance of a positive interlock between the fastener and the workpiece, upon complete insertion of the fastener shank.

More specifically, the present invention contemplates a fastener of the type indicated above in which the shank member is readily yieldable transversely to opposing forces acting in a given diametral direction whereby to permit ease of initial insertion within a work aperture, said shank being relatively rigid in resisting opposing forces acting in a diametral direction normal to the first mentioned forces as the shank reaches full insertion within a work aperture, whereby to assure a positive interlock with said workpiece.

It is a further object of the present invention to provide a fastener which, because of its structural characteristics, may be made of suitable plastic material and molded in one piece by practicing conventional molding methods.

A further object of the present invention is to provide fasteners of the type referred to above in which a minimum amount of material is required to provide the shank portion of the fastener and in which the head of the fastener is designed so as to enable it to serve as a support for objects of varied form.

The foregoing and other objects and advantages will be more apparent from the following detailed description when considered in connection with the accompanying drawings, wherein:

FIG. 1 is a fragmentary perspective view of an apertured workpiece, having in readiness for telescopic association therewith, a fastener device of the type contemplated by the present invention;

FIG. 2 is a vertical transverse sectional view of the workpiece and fastener of FIG. 1, after the fastener has been interlocked with the workpiece;

FIG. 3 is a detailed transverse sectional view taken substantially along the line 3—3 of FIG. 2;

FIG. 4 is a vertical sectional view similar to FIG. 2, disclosing the free extremity of a resilient arm of the fastener head sprung inwardly toward the workpiece so as to trap a plurality of conductors carried thereby;

FIG. 5 is a horizontal sectional view affording a plan view of the fastener as shown in FIG. 2;

FIG. 6 is a fragmentary sectional view similar to FIG. 4, disclosing a slightly modified fastener head;

FIG. 7 is a view similar to FIG. 6, disclosing a still further modified fastener head structure;

FIG. 8 is a fragmentary horizontal sectional view taken substantially along the line 8—8 of FIG. 7;

FIG. 9 is an elevational view of a fastener having a modified shank structure contemplated by the present invention;

FIG. 10 is a transverse sectional view taken substantially along the line 10—10 of FIG. 9;

FIG. 11 is a view showing another modified form of fastener shank formed integral with a rivet type head;

FIG. 12 is a transverse sectional view taken substantially along the line 12—12 of FIG. 11;

FIG. 13 is an elevational view similar to FIGS. 9 and 11 of a further modified form of fastener;

FIG. 14 is an end elevational view taken from the right of FIG. 13; and

FIG. 15 is an elevational view of another modified form of fastener contemplated by the present invention.

Referring now to the drawing, wherein like numerals have been employed to designate similar parts throughout the various figures, it will be seen that a fastener device representative of one embodiment of the present invention is designated generally by the numeral 10. This fastener device 10 is preferably of one piece molded plastic form, and includes a stud or shank member 12 and a head 14 formed integral with said shank at one extremity thereof. In FIGS. 1–5, inclusive, the fastener 10 is shown in association with an aperture 16 of a workpiece 18. As shown in FIGS. 2, 4, and 5, the shank or stud portion 12 of the fastener 10 is adapted to be telescopically associated with the aperture 16 of the workpiece, and the head 14 is adapted to bear against one side of the workpiece 18.

Particular attention is directed to the structural arrangement of the shank portion 12. In transverse cross-section, the shank body is partially tubular in form so as to present a pair of laterally resilient circumferential wall sections 20 and 22. Extending longitudinally and medially of the laterally shiftable wall sections 20 and 22 is a reinforcing and shank centering section or strut member 24. As will be seen from FIGS. 2 and 4, the periphery of the substantially semitubular shank portion and the outer or peripheral upper longitudinal edge of the reinforcing member 24 taper toward the entering end of the shank so as to facilitate initial telescopic association thereof with the work aperture 16. The diameter of the shank 12 adjacent the head 14, when measured from the peripheral shank surface at A to the diametrically positioned edge of the member 24 as viewed in FIGS. 2 and 4, is such as to insure a snug fit within the work aperture 16. In other words, the distance between the longitudinal edge of the reinforcing strut member 24 and the outer surface of the substantially semitubular shank portion in the vicinity of the head at A is substantially equal to the diameter of the aperture 16. The inherent resiliency of the plastic material of the fastener will permit a certain amount of yield so as to assure a very tight fit within the workpiece across the diameter of the work aperture when the fastener shank has been fully inserted and the head brought into engagement with one side of the work surface. The circumferential extent of the combined shank walls 20 and 22, as viewed in FIG. 3, is somewhat more than a complete semicircle.

It will also be noted that the maximum diameter, taken across the laterally yieldable shank walls 20 and 22, before insertion within the work aperture 16 is normally slightly larger than the diameter of said aperture. Thus, as the shank 12 is telescopically associated with the aperture the resilient members 20 and 22 yield radially inwardly as the shank approaches its final position within the workpiece; and when the head 14 is finally clamped against the work surface, the free corner edges of the members 20 and 22 will spring radially outwardly so as to occupy their normal position as shown in FIG. 3.

Portions of the shank sections 20 and 22 adjacent the head 14 are provided with notches 25. The width of the notches 25 may be substantially equal to the thickness of the workpiece 18 as shown in FIGS. 2 and 4, and in some instances, such as shown in FIG. 9, the thickness of the workpiece (shown by dot and dash lines) may be somewhat greater than the width of the notches. These notches 25 present shoulder portions or corners adapted to snap into overlapping and interlocking relation with respect to the workpiece when the head has been finally clamped against the work surface as shown in FIG. 2. As previously pointed out, the presence of the longitudinal reinforcing member 24 facilitates proper centering of the shank as it is inserted within the work aperture, and also presents a reinforcing shank strut extending transversely of the work aperture.

It has been found advantageous to employ a fastener head possessing axial resiliency. It will be noted from FIG. 1 that the head 14 is provided with a central body portion or section 26 having a pair of wing members or arms 28 extending from opposite margins thereof and inclined slightly with respect to the plane of the member 26. Thus, as the free extremities of the arms 28 are brought into engagement with the work surface, they will flex and permit the central body portion 26 to be drawn into engagement with the surface of the workpiece 18 as shown in FIG. 2.

For the purpose of illustrating one practical embodiment of a work supporting element which may be incorporated in the fastener head, a structure has been shown which is designed to accommodate a plurality of conductors 30. These conductors are received within a pocket 31 defined by the central plate or head section 26 on one side, and a laterally spaced section 32 hingedly connected with the bottom margin of the head portion 26. The head section 26 is provided at its upper extremity, opposite the margin to which laterally spaced section 32 is hingedly connected, with laterally extending means such as flange 27 terminating in a lip or shoulder means 33 overlying and spaced from section 26. Lip 33 extends downwardly, as viewed in the drawing, towards the hinge of portion 32. The lip 33 and flange 27 form a throat adapted to accept the free end of portion 32. The free end or upper extremity 34 of portion 32 is provided with a resilient tang 35 extending angularly from the side facing section 26 and on the opposite side with a shoulder means 36 defined by lateral abutments 37. When the head sections 26 and 32 occupy the relative positions illustrated in FIG. 2, the upper portions of said sections are spaced whereby to facilitate the insertion of the conductors 30 within the pocket. After the desired number of conductors 30 have been placed in position, the upper extremity of the flexible member 32 may be shifted toward the head section 26 to the position shown in FIG. 4. In this position the upper extremity of the member 32 and a lip 33 extending from the upper margin of the head section 26 become interlocked, and a resilient tang 35 yieldably engages the head 26, thereby urging the upper margin of the member 32 into interlocking engagement with the lip 33. Due to the inherent resilient characteristic of the plastic material from which the fastener is made the interlocked portions of the head may be disengaged by simply urging the section 32 away from the head section 26 by the application of sufficient force.

In FIG. 6 a slightly modified form of head structure is shown comprising a head section 26a and a section 32a hingedly connected to the bottom of the section 26a. The only structural distinction between the device shown in the previous figures and this device is in interlocking arrangement between the upper extremity of the arms 32a and the upper margin of the head section 26a. In the device as shown in FIG. 4, the upper margin of the head section 26 carries a latch member extending downward, whereas in FIG. 6 the upper margin of the head section 26a carries a latching member which extends upwardly and interlocks with a complementary upper extremity of the member 32a.

FIGS. 7 and 8 disclose a further slightly modified form of the interlock between the head sections. In these figures the head section 26b interlocks with the upper extremity of the flexible head section 32b. In this arrangement the upper extremity of the section 32b interlocks with a complementary element formed integral with and projecting laterally of the head section 26b, as clearly shown in FIG. 8.

Obviously the head of the fastener may vary in design depending upon the use to which it is to be subjected. In some instances a conventional fastener or rivet-type head may be used (see FIGS. 9 to 15 inclusive). A fastener with a conventional rivet-type head may be used, for example, in applications where the fastener is to be employed to secure two workpieces together.

In FIGS. 9 and 10 a shank member of modified form is disclosed and is designated generally by the numeral 12a. The laterally shiftable wall sections 20a and 22a are shaped so as to provide greater thickness along the free margins of these wall sections in the vicinity of the clamping extremity of the shank. It will be noted also that the entering extremity of the shank is rendered less flexible laterally by having a transverse rib 34 (FIG. 9). The central longitudinally extending reenforcing strut 24a tapers radially inwardly toward this transverse reenforcing rib 34. A shank construction, as shown in FIGS. 9 and 10, is of particular significance when the lateral resiliency of the wall sections 20a and 22a is to be concentrated at a point spaced axially from the entering end of the shank.

In FIGS. 11 and 12 another modified form of fastener device is disclosed having a shank designated generally by the numeral 12b. This shank is provided with a pair of oppositely disposed laterally yieldable wall sections 20b and 22b, and a longitudinal reenforcing strut member 24b having functional characteristics similar to the previously mentioned strut members 24 and 24a. A resilient rivet-type head 26b is formed integral with one extremity of the shank 12b. In addition, the wall sections 20b and 22b are provided with a pair of axially spaced work interlocking elements 36 and 38 on the wall section 20b, and a similar pair of axially spaced elements 40 and 42 on the wall section 22b. These elements 36-42 each provide a shoulder for engaging the surface of a workpiece oppositely disposed from the surface engaged by the fastener head 26b.

FIG. 13 is a further modified form of rivet-type fastener having a shank designated generally by the numeral 12c, and oppositely disposed arcuate wall sections 20c and 22c formed integral with a longitudinal reenforcing strut 24c. A resilient fastener head 26c is formed integral with the shank at one extremity thereof. A plurality of laterally extending elements 44 on the wall section 20c, and a plurality of like oppositely diametrically disposed elements 46 on the wall section 22c, provide an arrangement of axially spaced work engaging shoulders somewhat similar to the shoulders provided by the previously mentioned elements or abutments 36 to 42 inclusive.

In FIG. 15 a further modified fastener stud or shank arrangement is shown, said shank being designated generally by the numeral 12d and including a pair of wall sections 20d and 22d. Opposite from the entering extremity of the shank 12d is an axially resilient head 26d. A shoulder providing element or lug 44d extends laterally from the wall section 20d, and a lug 46d extends laterally from the wall section 22d at a point axially spaced from the position of the element 44d. A reenforcing strut element or member 24d is provided, and this strut member is laterally supported on one side by a wall section 48 extending between the strut 24d and the shank wall 20d as clearly shown in FIG. 15. This form of shank is of particular significance in instances where it is deemed advisable to lend a certain amount of lateral rigidity to the shank wall 20d in the vicinity of the lead 26d and at the same time assure sufficient resiliency of the oppositely disposed shank section wall 22d to permit radially inward deflection of the element 46d as the shank is forced through a work aperture.

It will also be noted that the axial separation or spacing of the shoulder supporting lugs 36–38 and 40–42 of FIGS. 11 and 12, and lugs 44 and 46 of FIGS. 13 and 14, as well as the axial spacing of the lugs 44d and 46d of FIG. 15, adapts the respective fasteners for accommodating work panels of varying thickness. Thus, the shoulder of the lug 44d will accommodate a work panel of greater thickness than a panel which will be accommodated by the lug 46d.

Particular attention is directed to the practical significance of the open-sided tubular or partially tubular shank section. The outer peripheral surface of the laterally flexible side walls serve as an effective guide during the initial insertion of the fastener shank into the aperture 16. Also, when the fastener is completely inserted, the outer substantially semicylindrical shank periphery contacts the workpiece edge or margin defining the aperture 16 throughout at least half of the circumferential extent of said edge. In this position the strut member 24 (FIGS. 1 to 5 inclusive) functions to maintain the semicylindrical periphery of the shank in a firm position within the aperture, and the outer longitudinal edge of the reenforcing strut 24 bears against the medial oppositely disposed workpiece edge which defines the aperture 16. The strut members 24a, 24b, 24c and 24d perform the same function. It has been found advantageous to have the plane of the strut member disposed substantially normal to the line of tangency at the point or area of the juncture of the strut member with the tubular shank section formed by the combined laterally resilient walls such as the walls 20 and 22.

While in the drawings the axial width of the notches 25 in the shank walls 20 and 22 adjacent the fastener head 26 is substantially equal to the thickness of the workpiece 18, it will be clear that some variation in width of the notches is contemplated. In fact, this width may exceed the overall thickness of a single workpiece or a plurality of workpieces as the case may be. In such instances the resiliency of flexibility of the arms 28 function to take up variations between the thickness of the workpiece and the axial width of the notches. It should also be noted that the shoulders or corners presented by the walls 20 and 22 adjacent the notches 25 provide positive abutments to prevent unauthorized withdrawal or loosening of the fastener. Thus the open sided tubular or substantially semicylindrical shank presented by the combined wall sections 20 and 22, the transverse strut 24 positioned medially thereof, and the shoulders or corners of the walls 20 and 22, cooperate with the fastener head 14 to secure the fastener firmly within the work aperture. It should be appreciated also that the above-described open sided tubular shank body and medial strut make it possible to reduce to a marked degree the volume of stock required to mold the fastener without sacrificing strength and locking efficiency. It will be understood from the foregoing that the present invention contemplates a fastener of the type indicated above in which the shank member, consisting of the oppositely disposed shank walls 20 and 22 shown in FIGS. 1 to 5 inclusive, as well as the corresponding shank walls shown in FIGS. 9 to 15 inclusive, is readily yieldable transversely to opposing forces acting in a given diametral direction, namely radially inwardly. This transverse allowability permits ease of initial insertion within a work aperture. The reenforcing or strut member shown herein serves to resist opposing forces acting in a diametral direction normal to the forces tending to collapse the yieldable shank walls, and as the shank reaches its position of full insertion within the work aperture, a positive interlock with the workpiece is assured.

While for purposes of disclosure certain specific structural fastener details have ben illustrated herein, it should be understood that other modifications and changes are contemplated without departing from the spirit and scope of the appended claims.

The invention is claimed as follows:

1. A one piece plastic fastener of the class described, having a head, a shank structure extending axially from said head, said shank structure including an open sided tubular member which is adapted for insertion within a complementary aperture of a workpiece, the wall sections defining said open sided tubular structure in the vicinity of said head being laterally yieldable, work interlocking shoulder means associated with said laterally yieldable wall sections, and a longitudinal strut member within said tubular member extending laterally from the medial area of the inner periphery thereof in a direction substantially normal to the line of tangency in that area, said strut in the vicinity of said head extending outwardly away from the inner member a distance at least as far as an imaginary chord passing through the free extremities of said wall sections, the periphery of said shank structure tapering toward the entering end thereof to facilitate insertion within a workpiece aperture.

2. A one piece plastic fastener of the class described as set forth in claim 1, wherein the diameter of the shank in the vicinity of the head, when measured from the outer edge of the strut to the diametrically opposite area on the shank wall is substantially equal to the workpiece aperture with which it is to be associated, and the maximum diameter of the open sided tubular member in the vicinity of said head is greater than said first-mentioned diameter.

3. A one piece plastic fastener of the class described as set forth in claim 1, wherein said shoulder means are presented by recesses in said shank wall adjacent the fastener head.

4. A one piece plastic fastener of the class described as set forth in claim 1, wherein the circumferential extent of the tubular wall at the shoulder means is somewhat greater than a semicircle.

5. A one piece plastic fastener of the class described as set forth in claim 1, wherein the tubular wall of the shank immediately adjacent the head is semicircular in cross section.

6. A one piece plastic fastener of the class described as set forth in claim 1, wherein the strut is substantially flat and bisects the tubular shank wall.

7. A one piece plastic fastener of the class described as set forth in claim 1, wherein the tubular wall is notched adjacent the head so as to present the shoulder means, said notches having an axial width sufficient to accommodate the thickness of the workpiece with which the fastener is to be used.

8. A one piece plastic fastener of the class described as set forth in claim 1, wherein said laterally yieldable wall sections are provided with work interlocking lug members extending radially outwardly from the outer periphery of said wall sections.

9. A one piece plastic fastener of the class described as set forth in claim 1, wherein a work carrying device extends from and is supported by the fastener head at the side of the head oppositely disposed from the shank.

10. A one piece plastic fastener of the class described as set forth in claim 1, wherein a work carrying device having pocket means for accommodating said work extends from and is supported by the fastener head on the side oppositely disposed from the shank.

11. A one piece plastic fastener of the class described, including a shank for insertion within the aperture of a work panel, laterally yieldable panel interlocking shoulder means associated with said shank to permit insertion within a work aperture, and a head structure for clampingly engaging the side of a work panel surface oppositely disposed from the panel surface engageable by said shoulder means, said head structure presenting a panel engaging section, a wall portion marginally connected with said work panel engaging section and deviating from the plane thereof so as to provide an opening therebetween for accommodating elongated workpieces such as conductors, shoulder means support extending from said head structure in the general vicinity of the margin thereof oppositely disposed from the margin to which said wall portion is connected, first shoulder means on said support spaced laterally from said head structure and second shoulder means in the vicinity of the free extremity of said wall portion, said support and shoulder means thereof defining an area for detachably receiving the free extremity of said wall section, whereby to permit interlocking association of the first and second shoulder means, the disposition of said support and wall section being such as to assure maintenance of the interlocking relationship of the first and second shoulder means after the free extremity of the wall portion has been received in the area adjacent the support for the first shoulder means.

12. A one piece plastic fastener as set forth in claim 11, wherein the interlocking shoulder means between the free margin of the wall portion and a margin of the work panel engaging section include shoulder means for superimposing the free margin of the wall portion.

13. A one piece plastic fastener as set forth in claim 11, wherein means is provided for resiliently urging the free margin shoulder means of said wall portion into interlocking association with the shoulder means of said work panel engaging section.

14. A one piece plastic fastener as set forth in claim 11 wherein a margin of the work panel engaging section is apertured to accommodate the shoulder means of the free margin of the wall portion so as to provide an interlock.

15. A one piece plastic fastener as set forth in claim 11 wherein the free margin of the wall portion is apertured to accommodate the shoulder means and support therefor associated with the head portion so as to provide an interlock.

16. A one piece plastic fastener as set forth in claim 11 wherein the support for the shoulder means in the general vicinity of one margin of the head structure is so disposed as to accommodate the free margin of the wall portion immediately therebeneath in interlocked relation with the shoulder means associated with said free margin.

17. A one piece plastic fastener of the class described including a head structure and means for retaining said fastener to a work panel, said head structure presenting a panel engaging section, a wall portion marginally connected with said work panel engaging section, and deviating from the plane thereof so as to provide an opening therebetween for accommodating elongated workpieces such as conductors, means extending from said panel engaging section in the general vicinity of the margin thereof oppositely disposed from the margin to which said wall portion is connected and forming a throat for receiving the free extremity of said wall portion, said last mentioned means including first shoulder means spaced laterally from said head structure, second shoulder means provided adjacent the free extremity of said wall portion, said first shoulder means cooperating with said second shoulder means to detachably retain the free extremity of the wall portion within said throat, the disposition of said throat and wall portion being such as to assure maintenance of the interlocked relationship of the first and second shoulder means after the free extremity of said wall portion has been received within said throat.

18. A one piece plastic fastener as set forth in claim 17 wherein the throat for accommodating the free extremity of the wall portion is located beneath at least a portion of said means including said first shoulder means and between said work panel engaging section and said means including said first shoulder means.

19. A one piece plastic fastener as set forth in claim 17 wherein at least one of said means forming said throat or said wall portion is provided with means for resiliently urging said first and second shoulder means into continuous interlocking relationship when cooperatively engaged with one another.

References Cited

UNITED STATES PATENTS

| 2,438,523 | 3/1948 | Tinnerman | 24—213 X |
|---|---|---|---|
| 2,758,498 | 8/1956 | Johnson | 24—213 X |
| 3,015,869 | 1/1962 | Rapata | 248—73 X |
| 3,054,585 | 9/1962 | Roberts et al. | 248—74 |
| 3,093,874 | 6/1963 | Rapata | 85—5 |

CHANCELLOR E. HARRIS, *Primary Examiner.*

W. D. LOULAN, *Assistant Examiner.*

U. S. Cl. X.R.

85—5, 80; 24—73; 248—217